Dec. 22, 1925.　　　　　　　　　　　　　　　　1,566,927
D. ROSEN
DRY BATTERY
Filed March 25, 1924
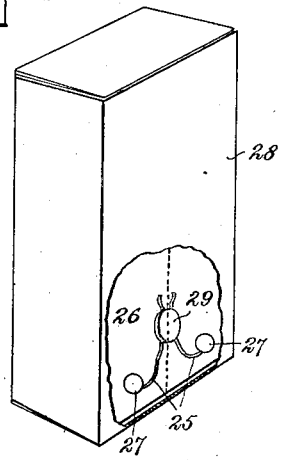
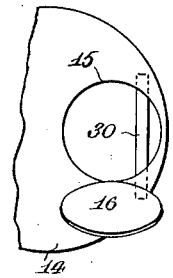
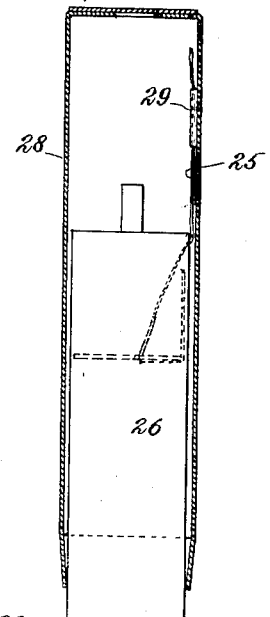
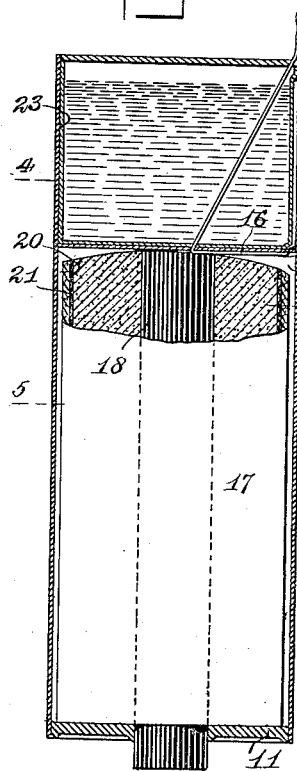
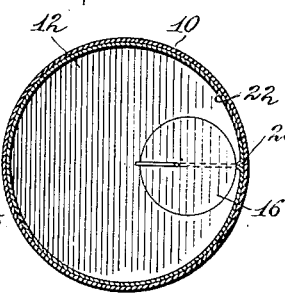
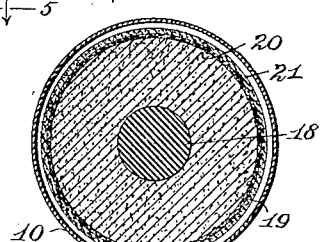
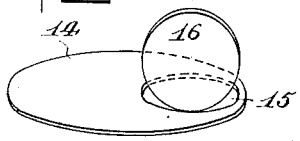
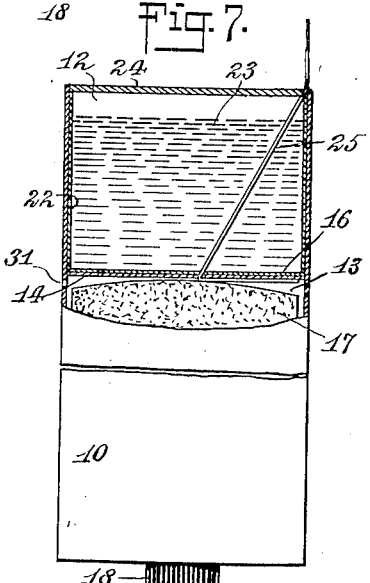
WITNESSES
William P. Goebel
E. L. Mueller
INVENTOR
David Rosen.
BY
ATTORNEYS Patented Dec. 22, 1925.

1,566,927

UNITED STATES PATENT OFFICE.

DAVID ROSEN, OF NEW YORK, N. Y.; BESSIE ROSEN ADMINISTRATRIX OF SAID DAVID ROSEN, DECEASED.

DRY BATTERY.

Application filed March 25, 1924. Serial No. 701,822.

*To all whom it may concern:*

Be it known that I, DAVID ROSEN, a citizen of the United States, and a resident of the city of New York, borough of Manhattan, in the county and State of New York, have invented a new and Improved Dry Battery, of which the following is a full, clear, and exact description.

This invention relates to improvements in batteries, and has particular reference to what is commonly known as a dry battery.

The invention is particularly designed as an improvement over my former Patent No. 1,417,692, dated May 30, 1922, and provides a battery in which the elements thereof, such as the electrode units and electrolyte, are normally kept inactive and which are rendered active by the withdrawal of the battery from its container preparatory to putting the battery into use.

Another object is to segregate the elements of the battery, one from the other, in such manner as to greatly minimize the possibility of any electrolytic action between any of said elements until such time when it is desired to use the battery, at which time the electrode units are caused to contact each other by the introduction of an electrolyte into one of them.

The above and other objects will appear more clearly from the following detailed description, when taken in connection with the accompanying drawing, which illustrates preferred embodiments of the inventive idea.

In the drawing—

Figure 1 is a perspective view, partly broken away and shown in section, of a battery constructed in accordance with the invention;

Figure 2 is an enlarged vertical longitudinal section showing the battery in the process of being withdrawn from its container;

Figure 3 is an enlarged vertical longitudinal section through a cell any number of which may be combined to form a battery, there being two of such cells indicated in Figure 1;

Figure 4 is a section on the line 4—4 of Figure 3;

Figure 5 is a section on the line 5—5 of Figure 3;

Figure 6 is a perspective view of a valved diaphragm employed for dividing the cell into compartments;

Figure 7 is a view somewhat similar to Figure 3 showing a slightly different form of the invention; and Figure 8 is a perspective view of a slightly different form of diaphragm which may be used.

Each cell of the battery consists of a casing 10, preferably made of zinc to form one of the electrode units of the cell, and this casing is suitably closed at one end by a body 11 of sealing wax or other material. The casing 10 is divided into compartments 12 and 13 by means of a diaphragm or partition disposed in the casing intermediate the ends thereof and having an opening 15 adjacent its periphery normally closed by a valve 16 for a purpose which will presently appear.

Arranged in the compartment 13 is the other or carbon electrode unit of the cell generally indicated by the numeral 17 and comprising the central carbon element 18 extended through a body of material 19 consisting of a de-polarizing mixture having a suitable moisture content and held in place by cloth wrapping 20. This wrapping is in turn surrounded by a layer of plastic material 21, such as a starch paste, which is normally spaced from the wall of the casing 10 when the cell is inactive, that is to say, before the cell has actually been put into use. By thus providing an annular air space about the unit 17 the possibility of any electrolytic action taking place between the electrode units will be greatly minimized. The layer 21 is of such a nature that the same will expand upon the introduction of an electrolyte into the compartment 13 and upon expansion of said material it will contact with the zinc casing 5 and thus produce the desired electrolytic action between the electrodes of the cell. Since the mixture 19 contained in the unit 17 is originally moist it will absorb little of the added electrolyte 23 and, therefore, the amount of the electrolyte to be added depends mainly on the size of the space separating the casing 10 from the layer of material 21.

The compartment 12 of the casing is preferably lined on its side wall and the surface of the diaphragm forming the bottom of said compartment with a layer of paraffine 22 and the electrolyte or water 23 is then introduced into the compartment and the end thereof closed by a layer of sealing wax 24. In assembling the construction shown in Figure 3, when the layer of paraffine 22 is placed in the compartment 12 one end of a pull string or other flexible element 25 is embedded in said layer and extends to a point adjacent the end 24 of the cell and the intermediate portion of said flexible element is extended diametrically across the surface of the valve 16 remote from the electrolyte 23. The flexible element is then extended through the diaphragm and layer of paraffine 22 and from thence outwardly through the end 24 of the cell leaving the free end of said flexible element projecting a considerable distance outwardly of the cell.

When two or more of the cells are combined to form a battery, as illustrated in Figure 1, said cells are placed in a wrapping 26 having openings therein normally closed by tabs 27 through which the flexible elements 25 extend, the extremities of said elements being joined together and attached to the inner surface of the container 28 by means of a quantity of sealing wax or other suitable material 29. With the cell or cells arranged in the container, as shown and described, the battery is extracted from the container by withdrawing the same from one end thereof, as shown in Figure 2, and with the ends of the elements 25 secured to the container at 29 it will be apparent that as the battery is withdrawn a pull will be exerted upon the flexible elements which will cause the same to move the valve 16 to open position, breaking the paraffine layer 22 thus forming a communication between the compartments 12 and 13 to permit the electrolyte 23 to flow into the latter compartment. Continued pull upon each flexible element 25 after the valve 16 in each of the cells are opened causes said element to be detached from the valve 16 and thereafter cut a groove in the layer of paraffine 22 adhering to the wall of the compartment 12. Finally the flexible element will be entirely withdrawn through the end 24 of the cell with the result that the groove formed in the layer of paraffine will extend from the opening 15 in the diaphragm along the wall of the compartment 12 to a point adjacent the opening in the end 24 through which said string has been withdrawn. This groove forms an air channel through which air in the compartment 13 is permitted to escape as the electrolyte 23 is flowing into said compartment, thus facilitating said flow. It has been found in actual practice that by extending a strip 30 (Figure 8) across the opening 15 adjacent one edge thereof the air from the compartment 13 is allowed to escape more freely, thereby permitting the electrolyte 23 to flow easily into the compartment 13 where, after a short period, it is absorbed by the starch layer 21 which then expands to fill the space between the electrode units to produce the desired effect.

In Figure 7 a slightly different construction is provided wherein the inner end of the flexible element 25 does not extend outwardly through the layer of paraffine but terminates at the valve. In this instance the casing 5 is provided with a small vent opening 31 preferably remote from the valve 16 so that when the valve is opened by a pull upon the flexible element the electrolyte 23 flowing through the opening 15 in the diaphragm will force the air in the compartment 13 outwardly through the vent 31, thus permitting the electrolyte to enter said compartment and be absorbed in the manner described.

From the foregoing description it will be apparent that the invention provides a battery in which the electrode elements, units and electrolyte are normally kept segregated and, therefore, in an inactive state so that the battery may be stored away for an indefinite period without affecting the quality thereof and that when said battery is removed from its container preparatory to its use the act of withdrawal will automatically bring the various elements of the battery into electrical association and thus cause said elements to perform their desired functions.

What is claimed is:

1. In a battery construction, a cell including a plurality of normally inactive elements, a container for said cell, and means actuated by the withdrawal of said cell from said container for rendering said elements active.

2. In a battery construction, a cell including a casing forming one of the electrodes of the battery, a second electrode normally spaced from said casing, an electrolyte in said casing normally spaced from said second electrode, a container for said cell, and means actuated by the withdrawal of said cell from said container to produce an electrolytic contact between said electrodes.

3. In a battery construction, a cell including a casing forming an electrode, an electrode unit in said casing and normally spaced therefrom, said unit including an expansible material, a container for said cell, and means actuated by the withdrawal of said cell from the container for introducing an electrolyte into said unit to produce expansion of said expansible material to cause the unit to electrically contact said electrode.

4. In a battery construction, a casing including normally segregated compartments one of which is capable of containing a liquid, means operable to establish communication between said compartments to permit said liquid to flow from one into the other, and a container for said casing to which said means is connected so that said means is operated by the withdrawal of the casing from the container.

5. In a battery construction, a casing including normally segregated compartments one of which is capable of containing a liquid, means operable to establish communication between said compartments to permit said liquid to flow from one into the other, a container for said casing, and means operable by the withdrawal of said casing from said container to operate the first-named means.

6. In a battery construction, a cell including a casing having a diaphragm therein dividing the cell into compartments one of which is capable of receiving an electrolyte, a normally closed valve for said diaphragm, and a flexible element having an inner portion secured to said valve and its other end projecting beyond said casing and operable by a pull on the latter end to open said valve to permit the electrolyte to flow from one compartment into the other.

7. In a battery construction, a cell including a casing, a diaphragm in said casing dividing the same into compartments one of which is capable of receiving an electrolyte, a lining for said compartment, a valve in said diaphragm normally closing communication between said compartments, and a flexible element having one end embedded in said lining, an intermediate portion engaged with said valve and its opposite end projecting beyond said casing and operable by a pull upon the latter end to open said valve and form an air channel in said lining adjacent the valve to permit of the escape of air from the other of said compartments and the flow of the electrolyte from the first-named compartment into said other compartment.

8. In a battery construction, a cell including a casing, a diaphragm in said casing dividing the same into compartments one of which is capable of receiving an electrolyte, a lining for said compartment, a valve in said diaphragm normally closing communication between said compartments, a flexible element having one end embedded in said lining, an intermediate portion engaged with said valve and its opposite end projecting beyond said casing and operable by a pull upon the latter end to open said valve and form an air channel in said lining adjacent the valve to permit of the escape of air from the other of said compartments and the flow of the electrolyte from the first-named compartment into said other compartment, and a strip extending across the opening in the diaphragm which is normally closed by said valve.

9. A battery construction including a plurality of spaced compartments, one of which is capable of containing a solid material and the other a liquid material, a diaphragm separating said compartments, a valve in said diaphragm, a layer of material in one of said compartments, and means operable to open said valve and having a portion thereof embedded in said layer of material, said means when operated to open said valve causing an air passage to be formed in said layer of material extending from a point adjacent said valve.

DAVID ROSEN.